United States Patent
Hwang et al.

(10) Patent No.: US 9,981,344 B2
(45) Date of Patent: May 29, 2018

(54) METHOD AND APPARATUS FOR SURFACE TREATMENT OF ROLL

(71) Applicant: POSCO, Pohang-si (KR)

(72) Inventors: Suk Kyun Hwang, Pohang-si (KR); Ji Woo Im, Pohang-si (KR); Byoung Jun Song, Pohang-si (KR)

(73) Assignee: POSCO, Gyeongsangbuk-Do (KR)

( * ) Notice: Subject to any disclaimer, the term of this patent is extended or adjusted under 35 U.S.C. 154(b) by 350 days.

(21) Appl. No.: 14/843,100

(22) Filed: Sep. 2, 2015

(65) Prior Publication Data

US 2016/0067829 A1 Mar. 10, 2016

(30) Foreign Application Priority Data

Sep. 4, 2014 (KR) ........................ 10-2014-0117818

(51) Int. Cl.
*B23K 26/362* (2014.01)
*B23K 26/70* (2014.01)
(Continued)

(52) U.S. Cl.
CPC ........ *B23K 26/362* (2013.01); *B23K 26/0072* (2013.01); *B23K 26/0084* (2013.01);
(Continued)

(58) Field of Classification Search
CPC ......... B23K 26/36; B23K 26/08; B23K 26/70
(Continued)

(56) References Cited

U.S. PATENT DOCUMENTS 4,959,275 A * 9/1990 Iguchi ................... B21B 27/005
101/32
4,978,583 A * 12/1990 Wakui ..................... B21B 1/227
219/121.68
(Continued)

FOREIGN PATENT DOCUMENTS

JP 62110881 5/1987
JP H05318151 12/1993
(Continued)

OTHER PUBLICATIONS

Chinese Office Action—Chinese Application No. 201510557725.5 dated Sep. 7, 2016, citing KR 1020110116823, JP H05318151, KR 20140012220 and JP 2006224481.
(Continued)

*Primary Examiner* — Samuel M Heinrich
(74) *Attorney, Agent, or Firm* — Cantor Colburn LLP (57) ABSTRACT

A method for surface treatment of a roll, in which a laser is emitted on a roll surface to fabricate a pattern, includes a section allocation operation in which the roll surface is divided into multiple sections, and a pattern fabrication operation in which the roll is rotated in a circumferential direction, and a random pattern is fabricated on each of the fabrication sections, and an apparatus includes an apparatus frame, a fixing unit which is installed on the apparatus frame, supports a roll, and rotates in a circumferential direction of the roll, a laser unit which is installed on the apparatus frame, and emits a laser to the roll so that a pattern received may be formed on the roll surface through etching, and a displacement unit which is installed on the apparatus frame, and moves the laser unit along a lengthwise direction of the roll.

12 Claims, 7 Drawing Sheets

(51) Int. Cl.
  *B23K 26/08* (2014.01)
  *B23K 26/00* (2014.01)
  *B23K 26/359* (2014.01)
  *B23K 26/06* (2014.01)
  *B23K 26/361* (2014.01)
  *B23K 101/06* (2006.01)
  *B23K 101/20* (2006.01)

(52) U.S. Cl.
  CPC ...... *B23K 26/0619* (2015.10); *B23K 26/0823* (2013.01); *B23K 26/0869* (2013.01); *B23K 26/359* (2015.10); *B23K 26/361* (2015.10); B23K 2201/06 (2013.01); B23K 2201/20 (2013.01)

(58) Field of Classification Search
  USPC ............ 219/121.68, 121.69, 121.76, 121.77
  See application file for complete search history.

(56) References Cited

U.S. PATENT DOCUMENTS

| | | | | |
|---|---|---|---|---|
| 5,338,627 | A * | 8/1994 | Shigeta | G03F 7/12 430/6 |
| 6,846,172 | B2 * | 1/2005 | Vaughn | B31F 1/07 101/23 |
| 6,931,991 | B1 * | 8/2005 | Cheng | B41C 1/05 101/375 |
| 8,122,937 | B2 | 2/2012 | Eastman | |
| 2002/0166653 | A1 | 11/2002 | Yamamura et al. | |
| 2003/0210484 | A1 | 11/2003 | Otake et al. | |
| 2013/0316185 | A1 * | 11/2013 | Evangelista | B32B 15/01 428/601 |

FOREIGN PATENT DOCUMENTS

| | | |
|---|---|---|
| JP | 09225639 | 9/1997 |
| JP | 2006224481 | 8/2006 |
| KR | 1020020026539 | 4/2002 |
| KR | 1020030081089 | 10/2003 |
| KR | 101051749 | 7/2011 |
| KR | 1020110116823 | 10/2011 |
| KR | 1020140012220 | 2/2014 |

OTHER PUBLICATIONS

Korean Office Action—Korean Application No. 10-2014-0117818 dated Feb. 22, 2016, citing KR 10-2014-0012220 and JP 62-110881.

* cited by examiner

*Prior Art*

METHOD AND APPARATUS FOR SURFACE TREATMENT OF ROLL

CROSS-REFERENCE TO RELATED APPLICATION

This application claims the benefit of Korean Patent Application No. 10-2014-0117818 filed on Sep. 4, 2014, with the Korean Intellectual Property Office, the disclosure of which is incorporated herein by reference.

BACKGROUND

The present invention relates to a method and apparatus for surface treatment of a roll, and more particularly, to a method and apparatus for surface treatment of a casting roll, by which a particular pattern may be quickly and accurately formed on a surface of the casting roll through etching.

Figure 1:
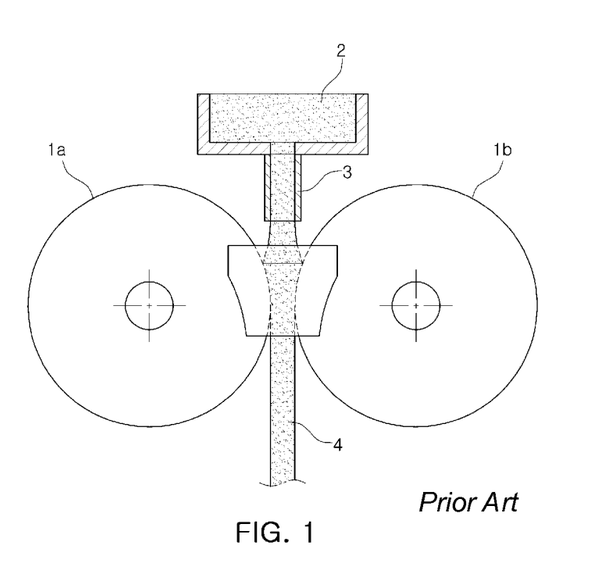
FIG. 1 schematically illustrates a typical twin-roll strip casting process.

In a typical twin-roll strip casting process, the shafts of a pair of rolls $1a$ and $1b$ are rotated in such a direction that the rolls are engaged with each other, and molten steel 2 is drawn through a nip which is formed between the rolls to thereby continuously cast a cast strip 4.

An apparatus which is used in such a process is called a twin-roll strip casting apparatus which is configured to manufacture the cast strip 4 by supplying molten steel 2 into a space between the pair of rolls $1a$ and $1b$ through a nozzle 3, and rapidly solidifying the molten steel 2 by an outflow of heat to the interior of the casting roll through contact between the rolls $1a$ and $1b$ and the molten steel 2 while rolling the rolls $1a$ and $1b$.

Here, an edge dam (not shown) made of a refractory material may be brought into close contact with both ends of each of the rolls $1a$ and $1b$ to prevent leakage of the molten steel 2. However, the edge dam may be easily worn through repeated contact and friction with the rolls $1a$ and $1b$ which are continuously rotating at a rapid rate.

Dust, such as wear debris, is produced at the edge dam (not shown) which is being worn out. Since introduction of such wear debris into the cast strip may cause defects such as cracks on the cast strip surface, a particular pattern may be formed on the surface of the rolls through etching to prevent the wear debris from being introduced into the cast strip.

When a particular pattern is formed on the surface of the roll through etching, it is possible not only to prevent the introduction of wear debris but also to effectively distribute the thermal stress in the cast strip 4. The cast strip 4 obtained is extremely thin at about 2 mm to about 6 mm, and thus a solidified shell which is formed initially has a large effect on the surface properties of the cast strip. However, since the contact time between the molten steel 2 and the rolls $1a$ and $1b$ is extremely short, the thickness of the solidified shell becomes non-uniform, and thus defects such as cracks or folding defects are formed on the surface of the cast strip. In this case, a subsequent rolling operation is negatively affected, and the surface quality of a final product may be degraded so that the value as a product declines.

Therefore, to prevent such defects, a method of suppressing the occurrence of surface defects by distributing the thermal stress in the cast strip 4 is used, and to this end, surface treatment by which dimples are formed on the surfaces of the rolls $1a$ and $1b$ is required.

Such dimples are formed by using the principle of making the thickness of the solidified shell become uniform by forming a gas gap as an insulating layer between the roll and the solidified shell to reduce the amount of heat which is drawn into the cooling roll, thereby inducing the solidified shell to be cooled slowly and also causing solidification to begin from the periphery of the dimple (rim portion of the dimple (recess)).

Figure 2:
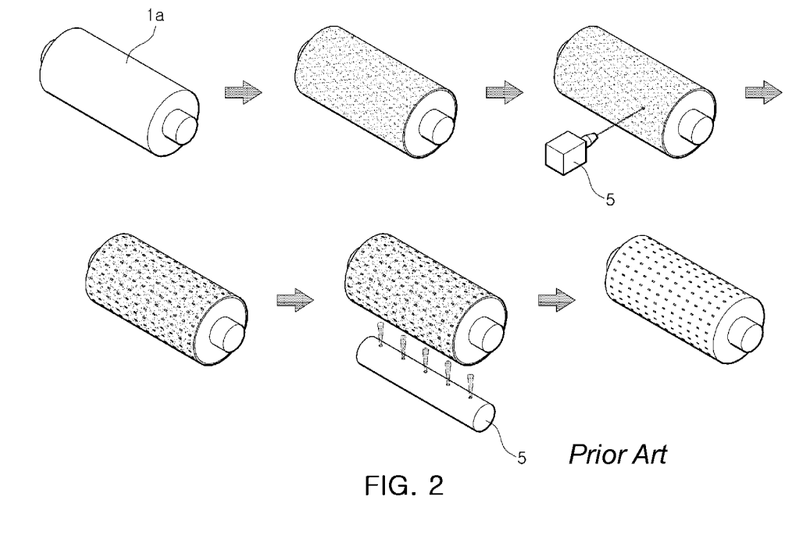
FIG. 2 schematically illustrates a typical casting roll pattern fabrication process.

FIG. 2 illustrates an example of forming dimples on the surface of the roll in sequence. First, foreign substances adhered to the surface are removed to apply a masking film on the roll $1a$. The applied masking film forms a coating which protects the surface of the roll $1a$ from an etching solution which is to be sprayed in a subsequent process.

After such a pretreatment has been completed, a photocurable photoresist resin or an acid resistant masking paint, which is in a liquid phase and curable at room temperature, is uniformly applied as a masking coating material to the surface of the roll through a spraying unit (not shown), and then dried at room temperature.

Thereafter, when the masking film has been formed on the surface of the roll, a laser unit 5 is used to remove only a portion of the masking film which is to be etched. Then, an etching solution is sprayed through an etching unit 8 onto the roll surface which has been patterned by the laser unit to thereby etch portions from which the masking film is removed. Consequently, fine dimples are formed, or the fine dimples contact each other to form a line or a plane.

Afterwards, the film is removed by a film removal unit (not shown) for removing the masking film which remains on the etched surface of the roll, and a finishing operation of washing the surface is performed, thereby completing formation of the dimples on the surface of the roll.

However, in the method described above, since the roll continually rotates at about 0.1 rpm to about 50 rpm, the maximum available time for a laser process is about 3 seconds, and is usually constrained to be less than about 3 seconds. Moreover, random patterns which follow a direction along the width of the roll cannot be connected, and thus there comes to be a limit on possible forms of the dimples which can be formed on the roll surface.

Moreover, when a vision system is used to realize precision in formation by a laser, the rolls must be stopped, which causes the operating time to be unnecessarily increased. Such an excess in operating time makes it difficult to optimize a patterning operation for each steel type, and thus there is no choice but to perform fabrication of a simple pattern, in which a simple shape is repeated, in order to reduce the operating time.

The simple pattern is shaped in such a way that a simple figure is repeatedly formed or a thin line is repeatedly formed with the objective of gas discharge. Since initial solidification conditions cannot be controlled through such a simple pattern, numerous strip fractures initially occur. In addition, even if casting continues, there is a limitation of being unable to prevent an adhesive phenomena, dent-type defect phenomena, etc., from occurring on the product surface.

RELATED ART DOCUMENTS

Patent Documents (Patent Document 1) KR1051749 B1 (registered on Jul. 19, 2011)

SUMMARY OF THE INVENTION

The present invention is devised to overcome such limitations as given above, and an object of the present invention is to provide a method and apparatus for surface treatment of a roll which uses a laser to quickly and easily perform surface treatment on the roll, and specifically a casting roll.

Also, an objective is to provide a method and apparatus for surface treatment of the roll, by which an optimal pattern may be formed on the roll surface according to solidification properties of various steel types.

Furthermore, an objective is to provide a method and apparatus for surface treatment of the roll, by which a random pattern for preventing initial fracture and occurrences of surface defects during a subsequent operation in the strip which is fabricated through casting rolls is formed, and the pattern thus formed may be rapidly fabricated.

Here, an objective is to provide a method and apparatus for surface treatment of the roll, by which a random pattern which includes the pattern area ratio, laser dimple size information, etc., and the formed pattern is concavely or convexly formed on the roll surface through etching.

In addition, an objective is to provide a method and apparatus for surface treatment of the roll, by which different patterns may be concavely or convexly formed on one roll surface through etching.

Thus, an objective is not only to prevent defects on the strip which is obtained by the casting rolls, but also to reduce the time taken for surface treatment of the roll, so that quality, workability, and productivity may all be improved.

In order to realize such objects as described above, a roll surface treatment method and apparatus are provided such as will be described below.

First, an aspect of the present invention provides a method for surface treatment of a roll, wherein a laser is emitted on a roll surface to fabricate a pattern, the method including a section allocation operation in which the roll surface is divided into multiple fabrication sections; and a pattern fabrication operation in which the roll is rotated in a circumferential direction, and a random pattern is fabricated on each of the fabrication sections.

In an aspect, the pattern fabrication operation may include a pattern formation operation in which a random pattern is formed on each of the fabrication sections; a pattern etching operation in which a laser unit moves above the fabrication sections and the pattern formed during the pattern formation operation is fabricated.

In another aspect, a method for surface treatment of a roll may desirably further include a pattern image-capturing operation in which images of the roll and the pattern on the roll surface are captured by an image-capturing unit, and image information is obtained which includes a rotation amount in a circumferential direction of the roll and a fabrication status of the pattern.

In an aspect, in the pattern fabrication operation, the pattern formation operation may be performed based on the image information which is acquired in the pattern image-capturing operation.

In another aspect, in the pattern etching operation, the laser unit may desirably move in a circumferential or lengthwise direction of the roll.

In another aspect, in the pattern fabrication operation, after the pattern etching operation is completed, the roll may desirably rotate in a circumferential direction for a given length, and the pattern formation operation may be performed while the roll is rotating.

In another aspect, the section allocation operation may include a section dividing operation in which a section which corresponds to a region ranging within a given angle in a circumferential direction of the roll is allocated as a first fabrication section, and the other section other than the first fabrication section is allocated as a second fabrication section.

In another aspect, the section dividing operation may desirably include a first dividing operation in which multiple vertical axis fabrication lines which are formed in a lengthwise direction of the roll are set to have a given height value in a circumferential direction of the roll in the first and second fabrication sections; and a second dividing operation in which the vertical axis fabrication line is divided into multiple horizontal axis fabrication lines.

In another aspect, the pattern etching operation may desirably include a unit setting operation, the unit being equipped with a first laser unit which emits a laser to the first fabrication section and a second laser unit which emits a laser to the second fabrication section.

In another aspect, in the pattern etching operation, with the roll in a stopped state, the first and second laser units may desirably emit lasers while moving along the vertical axis fabrication line, the first and second laser units emitting lasers in units of the horizontal axis fabrication line.

In addition, another aspect of the present invention provides a method for surface treatment of a roll, wherein a laser is emitted on a roll surface to fabricate a pattern obtained in formation of a pattern, the method including a pattern formation operation in which, when the roll surface is divided to be partitioned into multiple fabrication sections, random patterns are determined for the fabrication sections by running a randomizing function using fabrication ratios of the fabrication sections; and a pattern fabrication operation in which random patterns are fabricated on the fabrication sections.

In an aspect, the pattern formation and pattern fabrication operations may be respectively performed for each fabrication section.

In another aspect, the pattern formation operation may desirably include a vertical axis formation operation in which a random pattern is produced for a vertical axis fabrication line formed in a lengthwise direction of the roll, to have a given height value in a circumferential direction of the roll in the fabrication sections; and a horizontal axis formation operation in which the vertical axis fabrication line is divided into multiple horizontal axis formation lines, and a random pattern is produced for each horizontal axis formation line, the horizontal axis formation operation being performed separately for each one of the horizontal axis formation lines, and being performed when a laser unit moves between the horizontal axis formation lines.

In another aspect, the pattern fabrication operation may further include a line displacement operation, which is performed after laser emission by the first and second laser units is completed for one vertical axis fabrication line, and in which the roll is rotated in a circumferential direction by an amount equal to the value of the height of the one vertical axis fabrication line in a circumferential direction of the roll, so that the vertical axis fabrication line to be fabricated next is disposed to face each of the first and second laser units.

In an aspect, a pattern image-capturing operation may include a rotation detection operation, which is performed during the line displacement operation, and in which the amount of rotation in a circumferential direction of the roll is measured and stored as a rotation value; and the pattern formation operation may include a pattern correction operation, which is performed after the rotation detection operation, and in which a difference between a height value of one vertical axis fabrication line in a circumferential direction of the roll and the rotation value is stored as an error value, and the error value is applied to the vertical axis fabrication line to be fabricated next.

In another aspect, in the pattern fabrication operation, the roll may rotate in a direction which is opposite to the first and second laser units.

Another aspect of the present invention provides a roll surface treatment apparatus, including an apparatus frame; a fixing unit which is installed on the apparatus frame, supports a roll, and is provided to rotate in a circumferential direction of the roll; a laser unit which is installed on the apparatus frame, and emits a laser to the roll so that a pattern received may be formed on the roll surface through etching; and a displacement unit which is installed on the apparatus frame, and is provided to move the laser unit along a lengthwise direction of the roll.

In an aspect, the laser unit may include a first header part and a second header part arranged at positions which are laterally displaced from the roll and symmetrical to each other with respect to the rotational axis of the roll, and configured to emit a laser to the roll.

In another aspect, the apparatus may further include a control unit to which the laser unit, the displacement unit, and the fixing unit are connected, wherein, after the first and second header parts of the laser unit complete forming a pattern on a fabrication line which is formed in a lengthwise direction of the roll, the control unit controls the fixing unit to rotate the roll in a circumferential direction for a given length.

In still another aspect, the displacement unit may allow the first and second header parts to be temporarily stopped at given distances along the fabrication line.

BRIEF DESCRIPTION OF THE DRAWINGS

The above and other aspects, features and advantages of the present invention will be more clearly understood from the following detailed description taken in conjunction with the accompanying drawings, in which.

DETAILED DESCRIPTION

In order to assist in understanding exemplary embodiments of the present invention, like reference numerals will refer to like elements in the accompanying drawings, and in each embodiment, a part which is related to a part having a similar effect will have a like reference numeral or an extension thereof.

Moreover, in order to clearly describe the essential feature of the present invention, descriptions of those elements and technologies which are generally known from the related art will not be provided herein, and hereinafter, the present invention will be described in detail with reference to the accompanying drawings.

However, the concept of the present invention is not limited by the following embodiments, and forms thereof in which specific parts are extended, modified, or omitted may be proposed by a person with ordinary skill in the art, and thus will be understood as being within the scope of the inventive concept.

Figure 3:
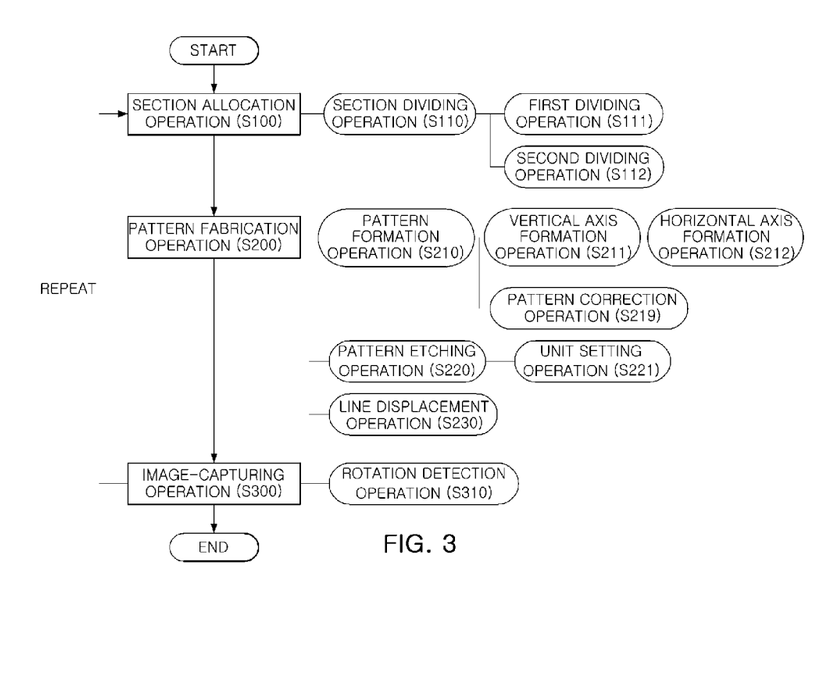
FIG. 3 schematically illustrates a concept of a method for surface treatment of a roll according to an embodiment of the present invention.

First, in an exemplary embodiment, a method for surface treatment of a roll surface in a manner as shown in FIG. 3 is provided. A method for surface treatment of a roll is provided, in which a laser is emitted on a roll surface, specifically a casting roll, to fabricate a pattern, the method including a section allocation operation S100 in which the roll surface is divided into multiple fabrication sections, and a pattern fabrication operation S200 in which the roll is rotated in a circumferential direction and a random pattern is fabricated on each of the fabrication sections.

In addition, a method for surface treatment of a roll is provided which improves the precision of a characteristic rotation in which a pattern is fabricated on the area which makes up the entire roll surface while rotating the roll in operations, and further includes a pattern image-capturing operation S300 to verify the state of the pattern which is fabricated on the roll surface.

The pattern image-capturing operation S300 captures the pattern which is fabricated by a laser unit which emits a laser on the roll and the roll surface, and obtains image information which includes the rotation amount in a circumferential direction of the roll and the fabrication state of the roll surface.

Here, a vision system may be desirably used as the image-capturing unit. The vision system, a system which identifies an object by using image processing, can diagnose a state of a target object by using a camera and a computer. Essential components including vision hardware, a camera, a lens, a light, and a cable, are required. In particular, the computer which is used may be used by being installed into a PCI slot of a main means of control. A processing method of the vision system includes point processing, area processing, geometry processing, and frame processing, and the above processing methods are mainly classified according to pixel value. The vision system is in accordance with an exemplary embodiment, and the type of image-capturing unit is not limited by the present invention.

As shown in FIG. 3, an exemplary embodiment of the present invention may be broadly composed to include the section allocation operation S100, the pattern fabrication operation S200, and the pattern image-capturing operation S300. Each of the operations may affect each other through interaction, and certain operations may be repeated. Specifically, with regard to the roll, after the section allocation operation S100 in which a given section of the roll, which faces a header part of the laser unit which emits laser, is allocated as the fabrication section, the fabrication operation S200 which fabricates a random pattern on the fabrication section is performed, after which the pattern image-capturing operation S300 is performed, which not only captures the pattern which is fabricated on the roll and roll surface, but also rotates the roll so that the next fabrication operation faces the header part of the laser unit, and during the process also measures the rotation amount of the roll by using the image-capturing unit.

And when the roll rotates so that the next section to be fabricated faces the header part of the laser unit, beginning with the section allocation operation S100, the above described pattern fabrication operation S200 and pattern image-capturing operation S300 are performed, and through repetition thereof, patterns may be sequentially fabricated on the roll surface.

Describing such a process in more detail, the section allocation operation S100 includes a section dividing operation S110 which allocates a section which corresponds to a region ranging within a given angle in a circumferential direction of the roll as a first fabrication section, and allocates the other section other than the first fabrication section as a second fabrication section. For example, when a section which spans from about 0 to about 180 degrees in a circumferential direction of the roll is allocated as the first fabrication section, the other section may be allocated as the second fabrication section.

The section dividing operation includes a first dividing operation S111 which sets multiple vertical axis fabrication lines in the first and second fabrication sections, and a second dividing operation S112 which divides the multiple vertical axis fabrication lines into multiple horizontal axis fabrication lines.

The vertical axis fabrication line has a given height value in a circumferential direction of the roll, and is also a path in which the header part of the laser unit is continuously provided in a lengthwise direction of the roll to etch the pattern while being displaced once in the lengthwise direction of the roll.

Moreover, the vertical axis fabrication line may be allocated as the horizontal axis fabrication line by splitting into given sections in a lengthwise direction of the roll, and the vertical axis fabrication line may be described as a plurality of the horizontal axis fabrication line.

To effectively perform the pattern fabrication operation S200 on the sections of the roll which are allocated as such, the pattern fabrication operation S200 is composed to include the pattern formation operation S210, the pattern etching operation S220, and the line displacement operation S230.

First, in the pattern formation operation S210, a random pattern is formed on the first and second pattern fabrication sections which are allocated on the roll, and the pattern etching operation S220 moves the laser unit above the pattern fabrication sections and fabricates the patterns which are formed in the pattern formation operation. Here, in the pattern formation operation, a random pattern is formed for the fabrication section, and may be formed by including pattern information such as surface area ratio, laser dimple size, fabrication state by positive or negative angle, etc.

The pattern etching operation S220 may etch the pattern by moving the laser unit in a circumferential or lengthwise direction of the roll, so that information about the pattern which is formed in the pattern formation operation S210 is acquired and the pattern etched.

The pattern etching is completed, and the roll is rotated in a circumferential direction so that the next vertical axis fabrication line to be fabricated may face the head part of the laser unit. Here, during rotation of the roll, the pattern image-capturing operation S300 is performed so that the surface and pattern fabrication state of the roll are captured, and the pattern formation operation S210 is also performed concurrently so that the pattern for the next vertical axis fabrication line is formed by applying image information which is obtained in the pattern image-capturing operation S300. Initially, at the start of fabrication where a fabrication image for the previous vertical axis fabrication line does not exist, the process of measuring, through the pattern image-capturing operation S300, the fabrication state and roll rotation amount for the previous vertical axis fabrication line, may be omitted.

When such a laser emission by the laser unit for the vertical axis fabrication line as described above is completely finished, the line displacement operation S230 may be performed. The line displacement operation rotates the roll in a circumferential direction by an amount equal to the height value of the one vertical axis fabrication line in a circumferential direction of the roll, so that the vertical axis fabrication line to be fabricated next is disposed to face the head part of the laser unit.

To summarize, after completing the pattern etching operation S220, the pattern image-capturing operation S300, and the pattern formation operation S210 the line displacement operation S230 may be performed, and desirably, the pattern image-capturing operation S300 may be performed while the line displacement operation S230 is being performed, and the pattern formation operation S210 may be performed while the line displacement and pattern image-capturing operations are being performed.

Figure 4:
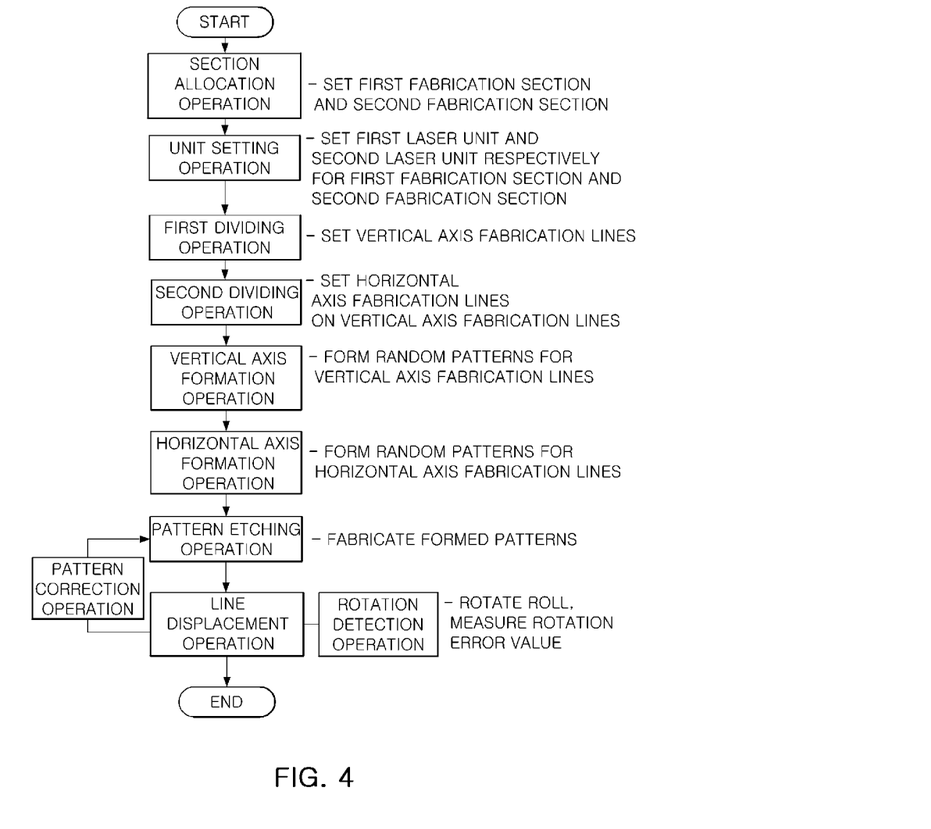
FIG. 4 schematically illustrates operations of performing a method for surface treatment of a roll according to an embodiment of the present invention.

In FIG. 4, the method for surface treatment of a roll surface according to an exemplary embodiment is shown in detail by operations for performing the method. A more detailed description will be continued with reference thereto.

In the section dividing operation S110, the roll surface is allocated as the first fabrication section and the second fabrication section. A unit setting operation S221 which is included in the pattern etching operation S220 is performed, and the unit setting operation is provided with a first laser unit which emits a laser on the first fabrication section and a second laser unit which emits a laser on the second fabrication section.

Next, the first dividing operation S111 is performed, setting the vertical axis fabrication line, and the second dividing operation S112 which divides the vertical axis fabrication line into horizontal axis fabrication lines is performed to divide the section of the roll surface. Here, it is also possible to perform the first dividing operation S111 and the second dividing operation S112 before performing the unit setting operation S221, and the order in which the above operations are performed may be suitably selected by someone with ordinary skill in the art.

Next, the pattern fabrication operation S200 is performed, and the pattern fabrication operation is performed through a given order of the pattern formation operation S210, the patter etching operation S220, and the line displacement operation S230, which are included therein. Specifically, to perform the pattern formation operation for the vertical axis fabrication line which is set in the first pattern dividing operation S111, a vertical axis formation operation S211 is performed for the vertical axis fabrication line, and the vertical axis formation operation includes a horizontal axis formation operation S212 which forms a random pattern for the horizontal axis fabrication line.

By separately setting the horizontal axis fabrication line on the vertical axis fabrication line, and producing and etching random patterns for each of the horizontal axis fabrication lines, the roll may have separate and differing random patterns in a lengthwise direction on the same vertical axis fabrication line through the horizontal axis fabrication lines. Moreover, in a pattern etching process of the laser unit for such a horizontal axis fabrication line, the laser unit may emit a laser in units of the horizontal axis fabrication line.

In other words, when pattern etching for one horizontal axis fabrication line is completed, the laser unit is temporarily stopped, during which time the horizontal axis formation operation S212 may be performed to complete the pattern formation for the next horizontal axis formation operation. Afterwards, the laser unit may again be moved to the next horizontal axis fabrication line so that a pattern formed for the next horizontal axis fabrication line may be etched.

Conversely, after completion of pattern etching for one horizontal axis fabrication line, a method of performing the horizontal axis formation operation S212 during displacement of the laser unit to the next horizontal fabrication line and without temporarily stopping the laser unit may be adopted. However, a person with ordinary skill may, as needed, only perform the vertical axis formation operation S211 without performing the horizontal axis formation operation S212 which forms the random pattern for the horizontal axis fabrication line, thereby fabricating an identical pattern on the vertical axis fabrication line. The consideration is one in which a selection may be suitably made in accordance with operating conditions such as characteristics of each steel type.

When the pattern etching operation, which fabricates the pattern which is formed on the vertical axis fabrication line or the horizontal axis fabrication line, is completed using such a method as above, the line displacement operation S230 is performed. As disclosed above, the pattern image-capturing operation S300 may also be performed during the line displacement operation S230, and specifically, a rotation detection operation S310 may be performed. The rotation detection operation S310 which is included in the pattern image-capturing operation S300 measures a rotation amount of the roll which has rotated once in a circumferential direction and stores the rotation amount as a rotation value.

Following the rotation detection operation, a pattern correction operation S219 in which a difference between a height value of the one vertical axis fabrication line and the rotation value is stored as an error value, and the error value is applied to the vertical axis fabrication line to be fabricated next.

Such rotation amount measurement, rotation value storage, height value storage, and error value calculation may desirably be achieved by numerical control through a numerical control (NC) machine. Afterwards, in the rotation detection operation S310, the vision system measures the rotation amount of the roll and sends the rotation value to a master part of the NC machine, and the master part performs an error value calculation to determine a rotation error and stores the rotation error as the error value.

A slave part of the NC machine which has received the error value performs the pattern correction operation S219, which reproduces the pattern on the section in which the error value is applied, by applying the acquired error value in the production of the pattern which is to be fabricated next by the vertical axis fabrication line.

Here, in the pattern correction operation S219, for example, when the height value of the previous vertical axis fabrication line is 10 mm and the fabrication of patterns which are produced for the vertical axis fabrication line is totally complete, the roll has to rotate by 100 mm so that the next vertical axis fabrication line is disposed to face the header part of the laser unit.

However, in the case in which the actual rotation amount of the roll which is image-captured by the vision system is 80 mm, and thus less than the rotation amount of the input which is 100 mm, the rotation value is 80 mm and the error value is 20 mm. Therefore, since pattern fabrication has already been completed in the section corresponding to the error value of 20 mm, the laser unit must not perform a repeat fabrication on the section corresponding to the 20 mm. Thus, in the pattern correction operation S219, such a value of 20 mm may be stored as a positive value, that is, +20 mm, and then included in the next vertical axis fabrication line. Consequently, in the pattern correction operation S219, the random pattern may be formed for the section corresponding to the height value of 21 mm to 100 mm in the next vertical axis fabrication line.

Conversely, when the rotation amount which is input in the roll exceeds 100 mm to thus rotate by 120 mm, the rotation value is 120 mm and the error value is 20 mm, but stored as a negative value, that is, −20 mm. Thus, in the pattern correction operation S219, the random pattern may be formed for the section corresponding to −20 mm to 100 mm based on the 100 mm height value of the next vertical fabrication line. Then, the pattern etching operation S220, the line displacement operation S230, and the rotation detection operation S310 may be repeated to etch the random pattern which is formed in the pattern correction operation, and such a process may be sequentially repeated for the entire section of the roll surface to thereby complete the pattern fabrication of the entire roll surface.

The line displacement operation S230 of the roll may be performed after emission of the first and second laser units on the one vertical axis fabrication line has been totally completed. That is, it is desirable to rotate the roll after the first laser unit which is positioned at the first fabrication section of the roll has completed laser emission for the one vertical axis fabrication line which is in the first fabrication section of the roll, and the second laser unit which is positioned at the second fabrication section of the roll has completed laser emission for the one vertical axis fabrication line which is in the second fabrication section of the roll.

Also, after the first laser unit and the second laser unit have completed being displaced once along the vertical axis fabrication line along the lengthwise direction of the roll, the first laser unit and the second laser unit may be moved back to the original starting position.

In rotating the roll in operations during the pattern fabrication operation S200, the roll may rotate in a clockwise or counterclockwise direction, and here, the roll may rotate in the opposite direction to the first and second laser units.

As described in an example above, in the case where the first fabrication section is allocated to a section corresponding to 0 to 180 degrees with respect to the roll in a circumferential direction, and then the roll rotates in a clockwise direction with respect to the header part of the first laser unit, the first roll rotates in a counterclockwise direction with respect to the header part of the second laser unit which is disposed in the second fabrication section.

This is because positioning the first laser unit and the second laser unit in a location in which the first and second laser units are symmetrical to each other with respect to the rotational axis of the roll may be desirable for quick and efficient fabrication, but the present invention is not limited thereto.

Furthermore, in the case in which, on the surface of the roll, the section corresponding to 0 to 180 degrees with respect to a circumferential direction of the roll is set as the first fabrication section and the remaining section is allocated as the second fabrication section, when fabrication for the first fabrication section and the second fabrication section nears the end, that is, when the rotation amount of the roll approaches 180 degrees, the height value which the vertical axis fabrication line has in a circumferential direction of the roll may be recalculated.

Towards the end of the fabrication, the height value of the section on the roll surface which remains in an unfabricated state is precisely measured and stored, based on the image information which is acquired by image-capturing the surface of the roll in the pattern image-capturing operation. Thus, the height value, which the section which remains in an unfabricated state has in a circumferential direction of the roll, is set as the final height value of the vertical axis fabrication line, and in the pattern formation operation, the height value of the vertical axis fabrication line thus formed may be received to form the pattern for the unfabricated section. Therethrough, the pattern may be precisely fabricated for the entire section of the roll surface without any occurrence of overlapping or unfabricated parts.

Furthermore, another exemplary embodiment provides a method for surface treatment of a roll in which a laser is emitted on a roll surface to fabricate a pattern obtained in formation of a pattern, the method including a pattern formation operation in which, when the roll surface is divided to be partitioned into multiple fabrication sections, random patterns are determined for the fabrication sections by running a randomizing function using fabrication ratios of the fabrication sections, and a pattern fabrication operation in which random patterns are fabricated on the fabrication sections.

Here, a vertical axis formation operation in which a random pattern may be produced for a vertical axis fabrication line formed in a lengthwise direction of the roll, to have a given height value in a circumferential direction of the roll in the fabrication sections, and a horizontal axis formation operation in which the vertical axis fabrication line is divided into multiple horizontal axis formation lines, and a random pattern is produced for each horizontal axis formation line, the horizontal axis formation operation being performed separately for each one of the horizontal axis formation lines, and being performed when a laser unit moves between the horizontal axis formation lines.

Specifically, multiple fabrication lines are allocated which occupy a given section on the roll surface, and the pattern fabrication ratio is set fora single fabrication section. The pattern fabrication ratio may be shown as the ratio between the entire surface area of the one fabrication section and the surface area in the one fabrication section which is being etched by laser emission, and for example, a pattern fabrication ratio of 100% means that a laser pattern is etching the entirety of the one fabrication section, and the section of the one fabrication section which is being etched becomes lower as the pattern fabrication rate approaches 0%.

In the pattern fabrication operation, a random pattern may be formed so that a pattern is formed in a single fabrication section through etching based on the pattern fabrication ratio which is set as above, and here, a randomizing function may be used. The randomizing function means that the preset pattern fabrication ratio is set as one of the variables, a Y value; the remaining variables, X values, are set as size and shape of the laser dimple, the spacing between the vertical fabrication lines, emboss or intaglio in laser pattern etching, or thermal spraying methods, etc.; and the remaining variables (X value) are set as random values so that the pattern fabrication ratio (Y value) is satisfied. Through the randomizing function which is set in such a manner, the random pattern for the pattern formation operation may be formed.

Such setting of the pattern fabrication ratio, and setting and calculation of the randomizing function, may be performed in the master part of the above-described NC machine, and the etching operation of the random pattern which is produced through methods such as those given above in the pattern formation operation may be performed by the slave part of the NC machine which has received the pattern information which is sent by the master part of the NC machine.

Setting of the pattern fabrication ratio and randomizing function of the pattern fabrication operation may be separately performed in units of one vertical axis fabrication line or one horizontal axis fabrication line, and after fabrication of one vertical axis fabrication line or one horizontal axis fabrication line is completed, setting of the pattern ratio and setting of the randomizing function for the next vertical axis fabrication line or the next horizontal axis fabrication line may be performed.

Such setting of the pattern fabrication ratio, and setting and calculation of the randomizing variable, may be performed in the master part of the NC machine which is described above, and the etching operation of the random pattern which is produced during the pattern formation operation through such methods as above may be performed by the slave part of the NC machine which has received the pattern information from the master part of the NC machine.

Setting of the pattern fabrication ratio and randomizing function in the pattern formation operation may be performed separately by units of one of the vertical axis fabrication line or one of the horizontal axis fabrication line, and after completion of one of the vertical or horizontal axis fabrication lines, setting of the pattern fabrication ratio and randomizing function for the next vertical or horizontal axis fabrication lines may be performed.

Figure 5A:
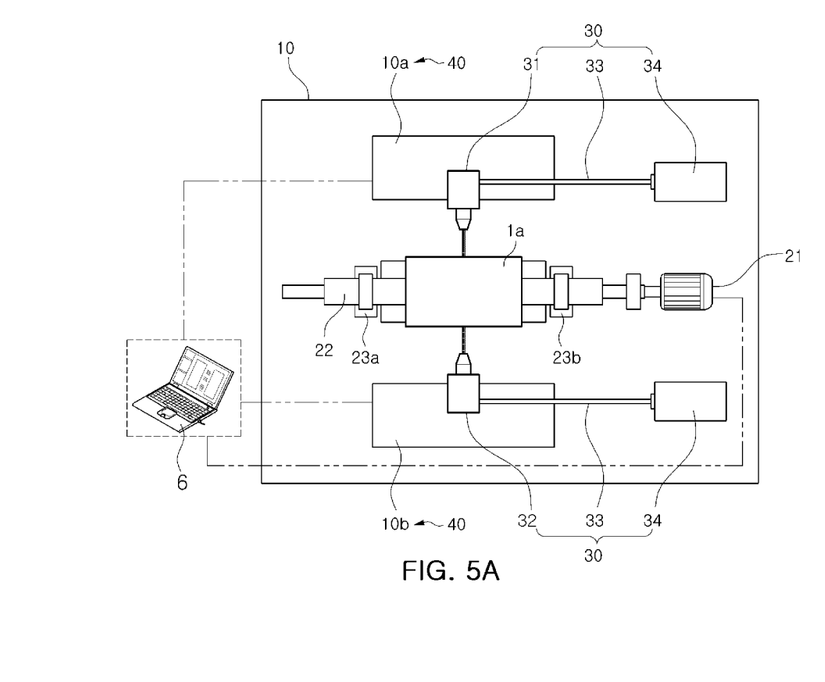
FIG. 5A is a conceptual diagram of an apparatus for surface treatment of a roll according to an embodiment of the present invention.

Meanwhile, another exemplary embodiment provides a roll surface treatment apparatus. Referring the roll surface treatment apparatus according to an exemplary embodiment which is shown in FIG. 5A, the roll surface treatment apparatus is composed to broadly include an apparatus frame 10, a fixing unit 20, a laser unit 30, and a displacement unit 40.

The roll surface treatment apparatus may be connected to a specific means of control 6, and in an exemplary embodiment, the means of control may be a master of a numerical control machine and the apparatus frame 10 of the present invention may be a transfer stage of the numerical control machine or may be equipped with a slave which is configured to be in connection with the transfer stage.

The fixing unit 20 may be installed in the apparatus frame 10 so that a roll 1a may be supported and rotated, and the fixing unit may include a motor 21, a fixed beam 22 which is connected to a shaft of the motor, and a first fastener 23a and second fastener 23b which are provided to fasten the fixed beam to the apparatus frame.

The fixed beam 22 is connected to the rotation shaft of the motor 21, and is inserted to fix the roll 1a so that the outer circumference of the shaft is in contact with the inner surface of the roll 1a. By being rotated along with the rotation of the motor 21, the roll 1a which is inserted into the outer circumference is rotated.

A servo motor, a spindle motor etc., may be used as the motor, but is not limited by the present invention and may be substituted in a suitable way by the operating environment and operator.

A laser unit 30 which etches a convex or concave pattern on a surface of such a fixed roll 1a is fixed on the apparatus frame 10 and provided to emit a laser on the surface of the roll 1a which rotates through the fixing unit 20.

A laser of an average of 20 W to 60 W is generated at the laser generation part 34, and the generated laser may be transmitted to the laser header part through a laser transmission part 33 which may be provided as a fiber optic cable or a pipe. Here, the laser header part, when considering the position of the roll 1a as the center, may be provided for each side of a lengthwise direction of the casting roll. Here, the header part which is positioned on one side of the roll is called a first header part 31, and the header part which is positioned on the other side is called the second header part 32.

To provide a laser to the first and second header parts 31 and 32 which are respectively provided, as described above, at each side with respect to a lengthwise direction of the roll A, a plurality of the laser generation part 33 may also be provided, in a manner similar to that of the first and second header parts 31 and 32.

By allowing the first header part 31 and the second header part 32 to fabricate the roll 1a concurrently from each side, there is an effect of drastically reducing the fabrication time.

Figure 5B:
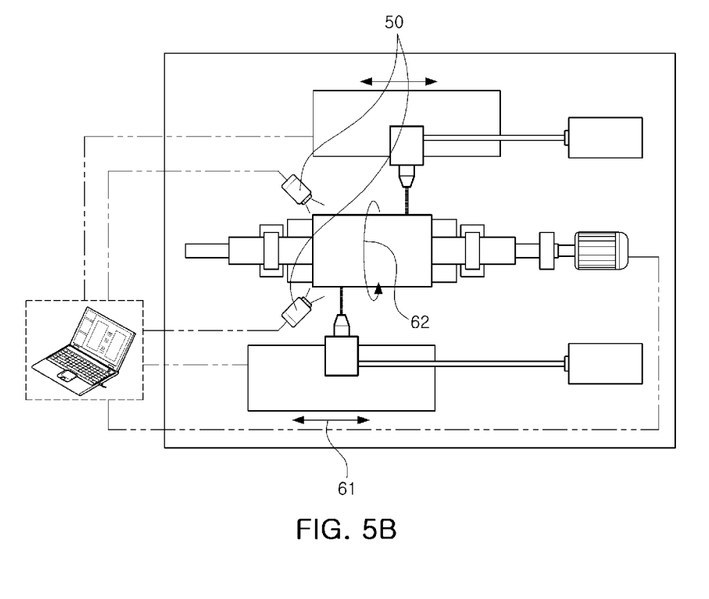
FIG. 5B is an operating state diagram of an apparatus for surface treatment of a roll according to an embodiment of the present invention.

Describing in further detail by referring to FIGS. 5A and 5B, at the starting point of fabrication, the first header part 31 and the second header part 32 may be positioned at the end part in a lengthwise direction of the roll 1a. Also, the first and second header parts 31 and 32 may receive, from the control means 6, a preset pattern, and the roll surface may be irradiated with a laser in order to etch the surface of the roll 1a.

Here, the first and second header parts 31 and 32 may be provided to each move independently on the apparatus frame 10. To realize such movement, in an exemplary embodiment, the apparatus frame may be provided as a first apparatus frame 10a and a second apparatus frame 10b, and the first and second apparatus frames 10a and 10b may be provided as a displacement unit 40 of an exemplary embodiment.

However, the above is an embodiment which is provided by the present invention, and the displacement unit 40 may be suitably adjusted and applied by the operating environment and operators, and is not limited by the present invention.

Alternatively, the first apparatus frame 10a which is installed in the apparatus frame 10 and connected to a lower part of the first header part 31, and the second apparatus frame 10b which is installed in the apparatus frame 10 and connected to a lower part of the second header part 32 may be provided. Moreover, the first apparatus frame and the second apparatus frame may each be connected to the means of control 6 and move along a lengthwise direction of the roll 1a, and be independently controlled on the apparatus frame 10.

As illustrated in FIG. 5B, the first and second header parts are each respectively connected to the first apparatus frame 10a and the second apparatus frame 10b, and emit a laser on the surface of the roll 1a while moving along a length direction 61 of the roll 1a. Here, the key point is that movement of the first and second header parts each be independent, and one line in which the pattern provided in the lengthwise direction 61 of the roll 1a is fabricated indicates a section within which the first and second header parts each move from one end to the other end in the lengthwise direction 61 of the casting roll.

Movement of each the first and second header parts is independent, and the one among the first and second header part which finishes fabrication earlier stands by until the other one completely finishes pattern fabrication for the one line of the roll. After both the first and second header part 31 and 32 have completed pattern fabrication for the one line, the first and second header parts may be returned to the original position with respect to a lengthwise direction of the roll to begin fabrication of the next line.

Meanwhile, the fixed beam 22 which had been fixing the roll becomes rotated a given distance by a rotation of the motor 21 which is connected to, and being controlled by, the means of control 6 so that the casting roll may be rotated for a given distance in a circumferential distance 62 to allow the next pattern fabrication line to be disposed to face the first and second header part 31 and 32. The rotation distance of the roll may be determined through calculation by the means of control 6.

Describing in detail, by referring to FIG. 4, fabrication of such the first and second header part 31 and 32, the first header part is provided so that a laser may be emitted to a first etching part which is a section in the range of 0 to 180 degrees of the surface of the roll.

Figure 6A:
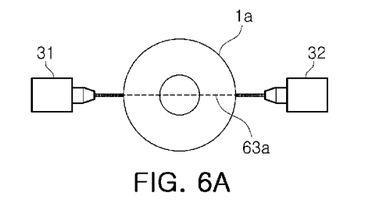
FIG. 6A is a conceptual fabrication diagram of a laser unit in an apparatus for surface treatment of a roll according to an embodiment of the present invention.

Referring to FIG. 6A, there is an initial fabrication start point 63a for the roll 1a. The initial fabrication start point 63a which may exist on any point on the surface of the roll is the first point on which a laser is emitted by the first header part and the second header part 31 and 32.

Figure 6B:
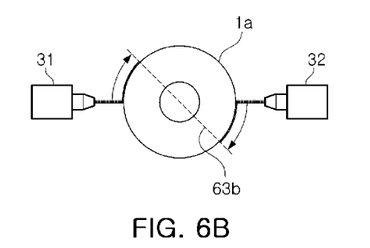
FIG. 6B is a conceptual fabrication diagram of a laser unit in an apparatus for surface treatment of a roll according to an embodiment of the present invention.

When laser etching begins, a state such as FIG. 6B may come to be. In a state in which the roll 1a has rotated a given distance which is calculated by the means of control 6, the initial fabrication start point 63a moves a distance which is equal to the distance which the casting roll is rotated to a position of a second fabrication start point 63b, and the first header part 31 and the second header part 32, which are fixed, come to face and emit a laser on another fabrication start point.

Figure 6C:
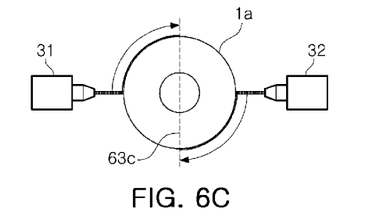
FIG. 6C is a conceptual fabrication diagram of a laser unit in an apparatus for surface treatment of a roll according to an embodiment of the present invention.
Figure 6D:
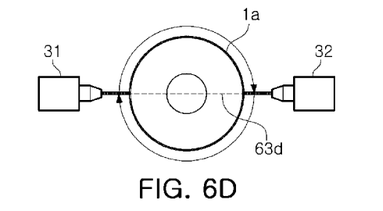
FIG. 6D is a conceptual fabrication diagram of a laser unit in an apparatus for surface treatment of a roll according to an embodiment of the present invention.

As casting continues to progress, the second fabrication start point 63b may become the state which is illustrated in FIG. 6C. That is, when the second fabrication start point 63b moves to a third fabrication start point 63c, the first and second header part 31 and 32 come to face and emit a laser on still another fabrication start point, and such a process is repeated after reaching a fourth fabrication start point 63d which is illustrated in FIG. 6D.

According to such a concept, when the surface of the roll 1a is seen as being within the range of 0 to 360 degrees, the first etching part becomes the section corresponding to 0 to 180 degrees, and a second etching part becomes the section corresponding to the remaining section.

By fabricating the first etching area with the first header part 31 and the second etching part with the second header part 32, the section of the entirety of the roll 1a which reaches to 360 degrees may all be fabricated.

Consequently, the first and second header part 31 and 32 each come to divide and acquire 180 degrees of the fabrication section for the surface of the roll 1a. Thus, without rotating the roll 1a by 360 degrees, a laser may be emitted by the first and second header part on both sides of the casting roll to allow pattern fabrication to be completed within a short amount of time.

Such calculation of a rotation distance of the roll 1a may be calculated by the means of control 6, and may be calculated differently according to the particular pattern which is produced and input by the means of control 6.

Meanwhile, a roll surface treatment apparatus according to an exemplary embodiment may further include an image-capturing unit 50 which captures images of the surface of the casting roll 1a, as is illustrated in FIG. 5B.

The image-capturing unit 50 may be connected to the means of control 6. The image-capturing unit may capture images of the state of the surface of the roll 1a, including the patterns which form on the surface of the roll, and transmit the images to the means of control 6.

The means of control 6 may apply the values which are received from the image-capturing unit 50 to verify a fabrication state of the pattern on the surface of the roll 1a, and calculates the next rotation distance of the roll 1a by taking the fabrication state of the pattern into account. Here, the image-capturing unit 50 may have a resolution which can identify distance in units down to 10 μm for the circumferential direction 62 of the roll 1a, and a shutter speed may be $1/1000$ of a second to obtain images which exclude a blur caused by vibration.

A lighting unit (not shown) may be further included to light the surface of the roll 1a, and the lighting unit may include a ring type.

According to a roll surface treatment method in accordance with an exemplary embodiment, time which is consumed to fabricate a particular pattern on a surface of the roll may be reduced.

A pattern which is appropriate for solidification characteristics of each type of steel may be quickly fabricated on the casting roll surface. Thus, by establishing a gas discharge path for a steel type which discharges a large amount of gas during solidification, occurrence of product surface defects may be suppressed.

Patterns which differ in conditions such as surface area ratio of a casting roll surface, and laser dimple size, etc., may be randomly fabricated, and thus a casting roll which is optimized for a casting operation may be produced.

Improvements in operability and productivity through a reducing fabrication time and suppressing an occurrence of defects are obviously contributions.

While the present invention has been shown and described in connection with the exemplary embodiments, it will be apparent to those skilled in the art that modifications and variations can be made without departing from the spirit of the present invention as defined by the appended claims.

What is claimed is:

1. A method for surface treatment of a roll, wherein a laser is emitted on a roll surface to fabricate a pattern, the method comprising:
   a section allocation operation in which the roll surface is divided into multiple fabrication sections;
   a pattern fabrication operation in which the roll is rotated in a circumferential direction, and a random pattern is fabricated on each of the fabrication sections; and
   a pattern image-capturing operation in which images of the roll and the pattern on the roll surface are captured by an image-capturing unit, and image information is obtained which includes a rotation amount in a circumferential direction of the roll and a fabrication status of the pattern,
   wherein the pattern fabrication operation comprises:
   a pattern formation operation in which a random pattern is provided on each of the fabrication sections; and
   a pattern etching operation in which a laser unit moves above the fabrication sections and the pattern provided during the pattern formation operation is fabricated.

2. The method of claim 1, wherein, in the pattern fabrication operation, the pattern formation operation is performed based on the image information which is acquired in the pattern image-capturing operation.

3. The method of claim 1, wherein, in the pattern etching operation, the laser unit moves in a circumferential or lengthwise direction of the roll.

4. The method of claim 2, wherein, in the pattern fabrication operation, after the pattern etching operation is completed, the roll rotates in a circumferential direction for a given length, and the pattern formation operation is performed while the roll is rotating.

5. The method of claim 1, wherein the section allocation operation comprises a section dividing operation in which a section which corresponds to a region ranging within a given angle in a circumferential direction of the roll is allocated as a first fabrication section, and the other section other than the first fabrication section is allocated as a second fabrication section.

6. The method of claim 5, wherein the section dividing operation comprises:
   a first dividing operation in which multiple vertical axis fabrication lines which are provided in a lengthwise direction of the roll are set to have a given height value in a circumferential direction of the roll in the first and second fabrication sections; and
   a second dividing operation in which the vertical axis fabrication line is divided into multiple horizontal axis fabrication lines.

7. The method of claim 6, wherein the pattern etching operation comprises a unit setting operation, the unit being equipped with a first laser unit which emits a laser to the first fabrication section and a second laser unit which emits a laser to the second fabrication section.

8. The method of claim 7, wherein, in the pattern etching operation, with the roll in a stopped state, the first and second laser units emit lasers while moving along the vertical axis fabrication line, the first and second laser units emitting lasers in units of the horizontal axis fabrication line.

9. The method of claim 7, wherein the pattern fabrication operation further comprises:
   a line displacement operation, which is performed after a laser emission by the first and second laser units is completed for one vertical axis fabrication line, and in which the roll is rotated in a circumferential direction by an amount equal to the value of the height of the one vertical axis fabrication line in a circumferential direction of the roll, so that the vertical axis fabrication line to be fabricated next is disposed to face each of the first and second laser units.

10. The method of claim 9, wherein:
   a pattern image capturing operation comprises a rotation detection operation, which is performed during the line displacement operation, and in which the amount of rotation in a circumferential direction of the roll is measured and stored as a rotation value; and
   the pattern formation operation comprises a pattern correction operation, which is performed after the rotation detection operation, and in which a difference between a height value of one vertical axis fabrication line in a circumferential direction of the roll and the rotation value is stored as an error value, and the error value is applied to the vertical axis fabrication line to be fabricated next.

11. The method of claim 7, wherein, in the pattern fabrication operation, the roll rotates in a direction which is opposite to the first and second laser units.

12. A method for surface treatment of a roll, wherein a laser is emitted on a roll surface to fabricate a pattern obtained in formation of a pattern, the method comprising:

a pattern formation operation in which, when the roll surface is divided to be partitioned into multiple fabrication sections, random patterns are determined for the fabrication sections by running a randomizing function using fabrication ratios of the fabrication sections; and a pattern fabrication operation in which the random patterns are fabricated on the fabrication sections, wherein the pattern formation and pattern fabrication operations are respectively performed for each fabrication section; and wherein the pattern formation operation comprises:

a vertical axis formation operation in which a random pattern is produced for a vertical axis fabrication line provided in a lengthwise direction of the roll, to have a given height value in a circumferential direction of the roll in the fabrication sections; and a horizontal axis formation operation in which, the vertical axis fabrication line is divided into multiple horizontal axis formation lines, and a random pattern is produced for each horizontal axis formation line, the horizontal axis formation operation being performed separately for each one of the horizontal axis formation lines, and being performed when a laser unit moves between the horizontal axis formation lines.

* * * * *